United States Patent
Faruque et al.

(10) Patent No.: US 11,273,783 B1
(45) Date of Patent: *Mar. 15, 2022

(54) SIDE AIRBAG ASSEMBLY

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/019,427

(22) Filed: Sep. 14, 2020

(51) Int. Cl.
*B60R 21/207* (2006.01)
*B60R 21/231* (2011.01)
*B60R 21/2338* (2011.01)

(52) U.S. Cl.
CPC ........ *B60R 21/207* (2013.01); *B60R 21/2338* (2013.01); *B60R 21/23138* (2013.01); *B60R 2021/23146* (2013.01); *B60R 2021/23386* (2013.01)

(58) Field of Classification Search
None
See application file for complete search history.

(56) References Cited

U.S. PATENT DOCUMENTS

| | | | |
|---|---|---|---|
| 5,492,361 A * | 2/1996 | Kim | B60R 21/02 280/730.1 |
| 5,645,295 A | 7/1997 | White, Jr. et al. | |
| 5,730,458 A * | 3/1998 | Byon | B60R 19/00 280/730.2 |
| 5,749,597 A | 5/1998 | Saderholm | |
| 6,189,916 B1 | 2/2001 | Bowers et al. | |
| 7,637,531 B2 | 12/2009 | Paruszkiewicz, Jr. et al. | |
| 8,047,564 B2 | 11/2011 | Kibat et al. | |
| 8,936,271 B2 | 1/2015 | Festag | |
| 9,193,326 B2 | 11/2015 | Fukawatase | |
| 10,272,865 B2 * | 4/2019 | Nagasawa | B60N 2/753 |
| 10,569,732 B2 * | 2/2020 | Nagasawa | B60R 21/207 |
| 10,814,818 B2 * | 10/2020 | Dry | B60R 21/217 |
| 2019/0106077 A1 * | 4/2019 | Dry | B60R 21/215 |

FOREIGN PATENT DOCUMENTS

DE  102019116567 A1 * 12/2019 ........... B60N 2/4235

\* cited by examiner

*Primary Examiner* — Faye M Fleming
(74) *Attorney, Agent, or Firm* — Frank A. MacKenzie; Bejin Bieneman PLC

(57) ABSTRACT

A restraint system includes a seat defining a lateral axis and an airbag housing supported by the seat. The airbag housing includes a first arm and a second arm. The first arm is fixed relative to the seat, and the second arm is rotatable relative to the seat about a rotational axis generally parallel to the lateral axis. An airbag extends from the first arm to the second arm. The airbag is fixed to the first arm and the second arm.

20 Claims, 6 Drawing Sheets

SIDE AIRBAG ASSEMBLY

BACKGROUND

Vehicles are typically equipped with airbags. In the event of certain impacts, inflators activate and provide inflation medium to the airbags, and the airbags pressurize and act as supplemental restraints for occupants during the impact. The airbags are located at various fixed positions in passenger cabins of vehicles. Vehicles may include a driver airbag mounted in the steering wheel, a passenger airbag mounted in the top of the dash in a vehicle-forward direction from the front passenger seat, and side curtain airbags mounted in the roof rails above the doors.

DETAILED DESCRIPTION

Figure 1:
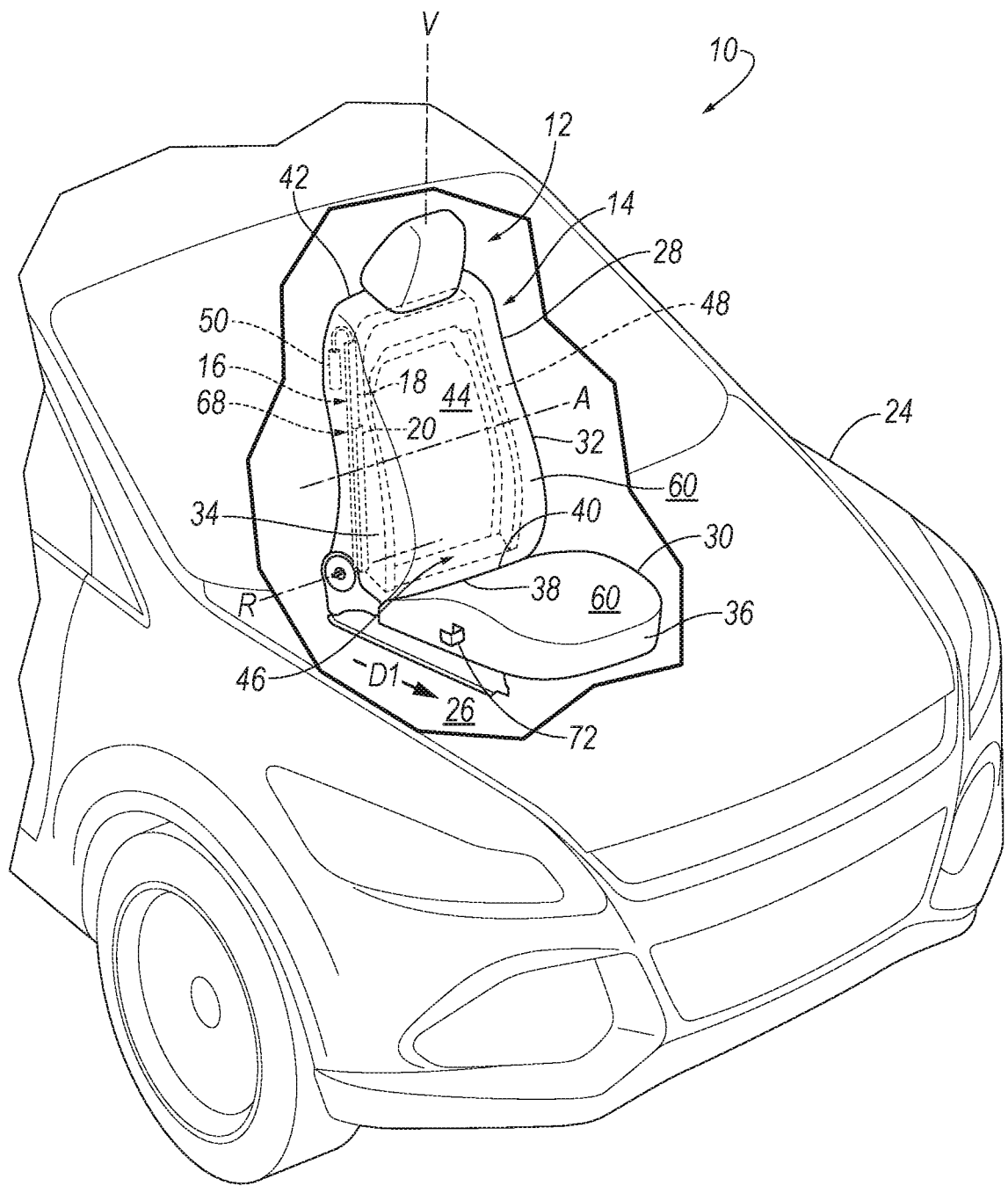
FIG. 1 is a perspective view of an example vehicle including a seat supporting an airbag in an uninflated position.

A restraint system includes a seat defining a lateral axis and an airbag housing supported by the seat. The airbag housing includes a first arm and a second arm. The first arm is fixed relative to the seat and the second arm is rotatable relative to the seat about a rotational axis generally parallel to the lateral axis. An airbag extends from the first arm to the second arm. The airbag is fixed to the first arm and the second arm.

The restraint system may include a plurality of external tethers extending from the first arm to the second arm when the airbag is in an inflated position.

The airbag may be disposed between the seat and at least some of the plurality of external tethers in the inflated position.

The plurality of external tethers may be attached to the first arm, the second arm, and the airbag. The external tethers may be under tension between the first and second arms when the airbag is in the inflated position.

The plurality of external tethers may be a reaction surface for the airbag in the inflated position.

The plurality of external tethers may be fabric.

The plurality of external tethers may be uninflatable.

The first arm and the second arm each may include an end spaced from the rotational axis. The airbag may be fixed to the end of the first arm and the end of the second arm.

The airbag may be fixed along the first arm from the second arm to the end of the first arm and along the second arm from the first arm to the end of the second arm.

The second arm may be rotatable from an undeployed position to a deployed position as a result of the airbag inflating.

The second arm may extend along the first arm in the undeployed position. The second arm may extend transverse to the first arm in the deployed position.

The first and second arms may each include an end. The end of the second arm may be spaced from the end of the first arm in the undeployed position.

The second arm and the seat may lock with each other in a fixed position when the second arm is in the deployed position.

The second arm may include a bar rotatable relative to the second arm when the second arm rotates relative to the seat to the deployed position.

The seat may include a bracket. The bar may be engaged with the bracket when the second arm and the seat are locked with each other in the fixed position.

The restraint system may include an inflator in fluid communication with the airbag. The inflator may be fixed to the seat and spaced from the housing.

The seat may include a seatback defining an occupant seating area and a seat bottom supporting the seatback. The airbag and the second arm may be adjacent to the seat bottom when the airbag is in the inflated position, and the airbag may extend from the second arm along the occupant seating area in an inflated position.

The seat may include a seatback. The first arm may be fixed to the seatback.

The restraint system may include a hinge between the first arm and the second arm. The hinge may be a locking hinge.

With reference to the Figures, wherein like numerals indicate like parts throughout the several views, a vehicle 10 is generally shown. The vehicle 10 includes a restraint system 12 having a seat 14 defining a lateral axis A and an airbag housing 16 supported by the seat 14. The airbag housing 16 includes a first arm 18 and a second arm 20. The first arm 18 is fixed relative to the seat 14, and the second arm 20 is rotatable relative to the seat 14 about a rotational axis R generally parallel to the lateral axis A. An airbag 22 extends from the first arm 18 to the second arm 20. The airbag 22 is fixed to the first arm 18 and the second arm 20.

Figure 2:
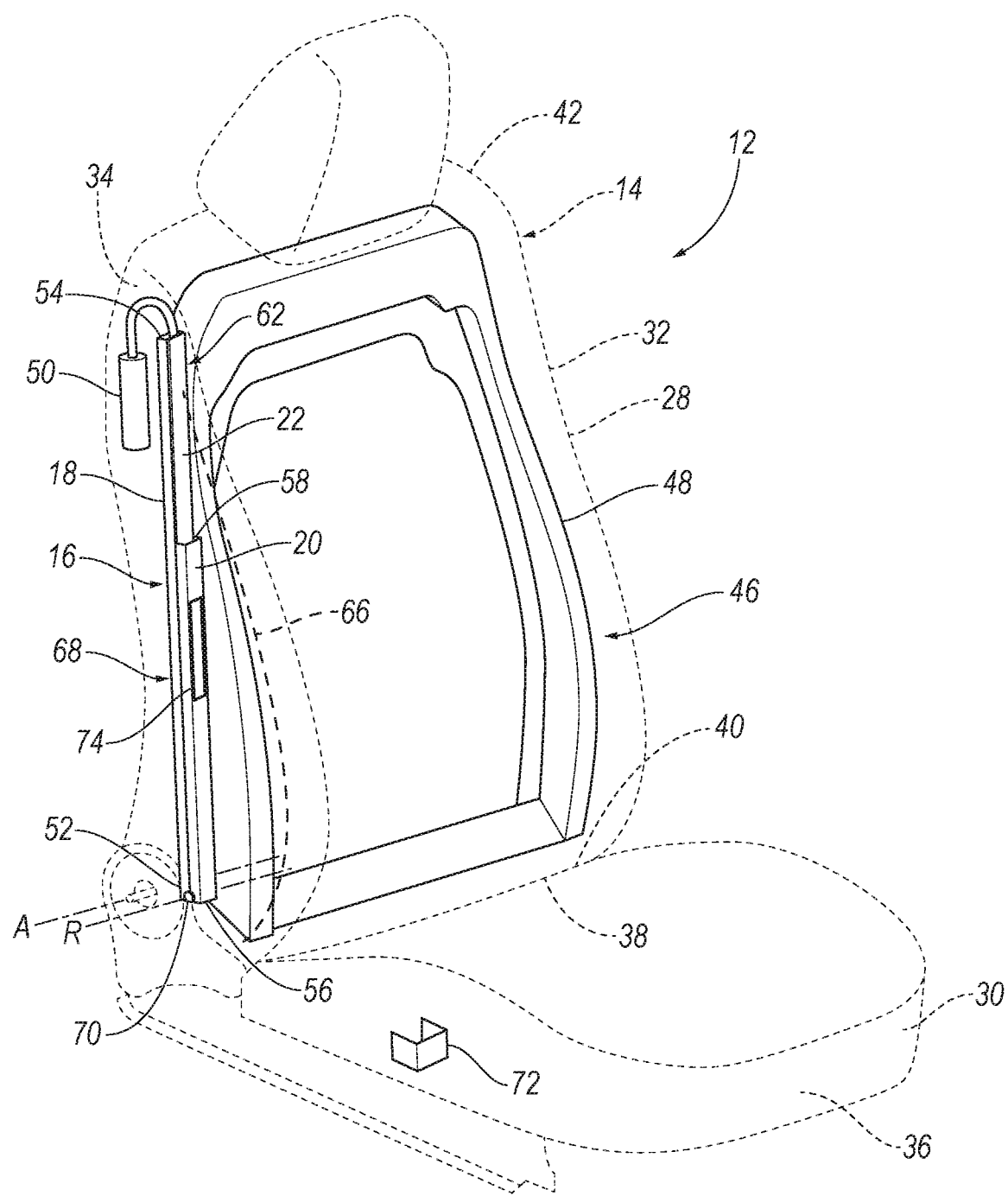
FIG. 2 is a perspective view of the seat including the airbag in the uninflated position.
Figure 3A:
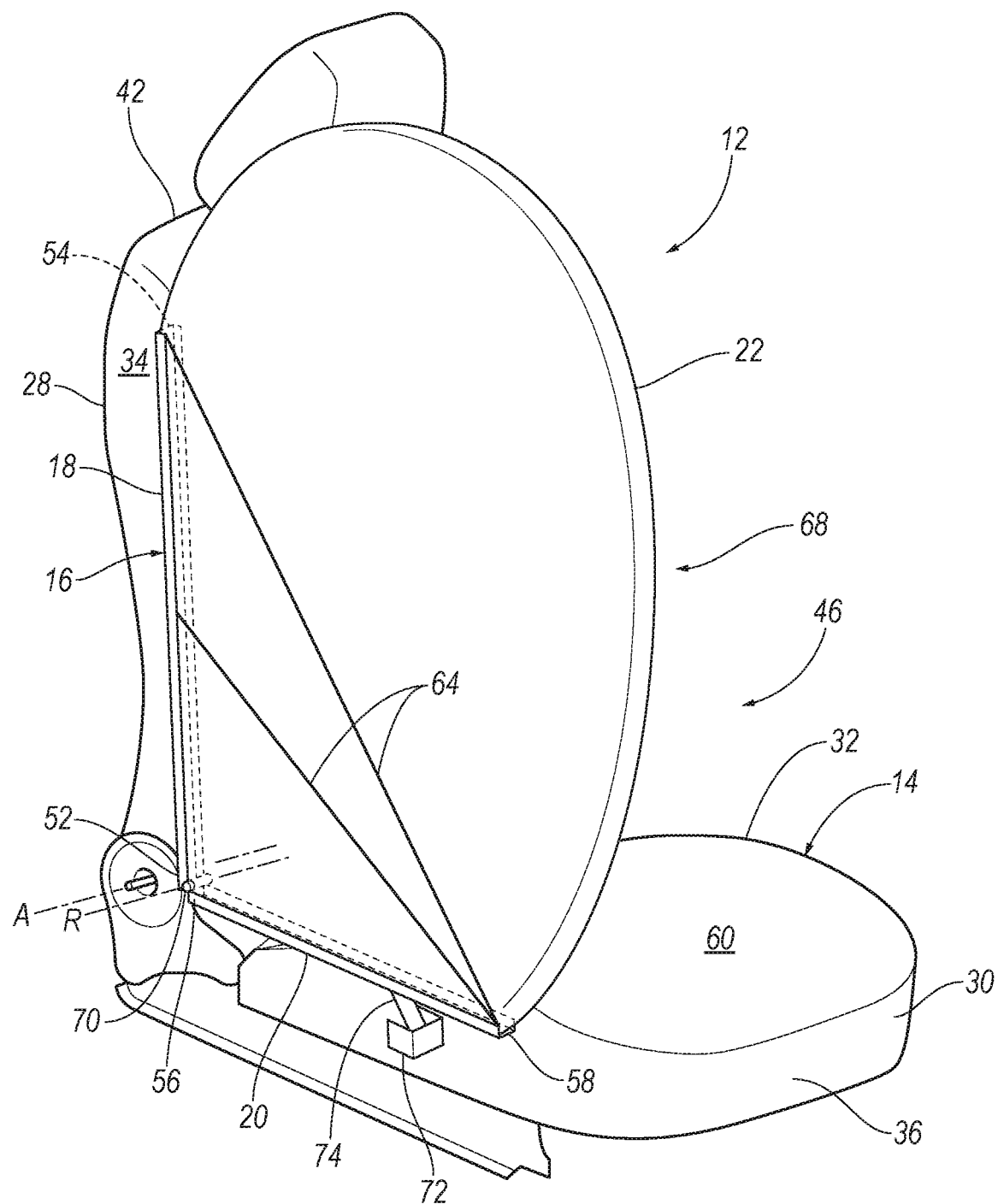
FIGS. 3A-3B are perspective views of the seat including the airbag in the inflated position.
Figure 3B:
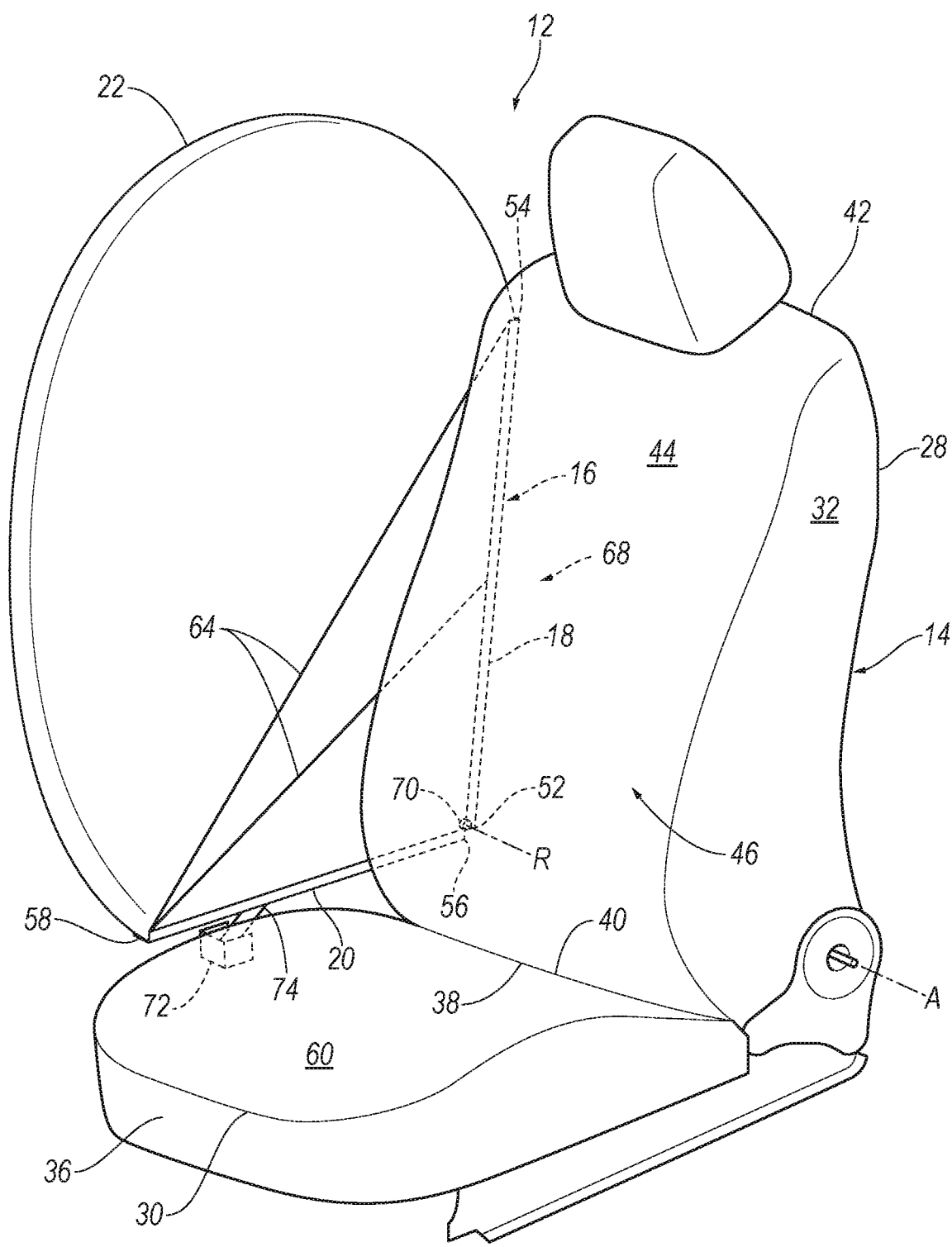
Figure 3C:
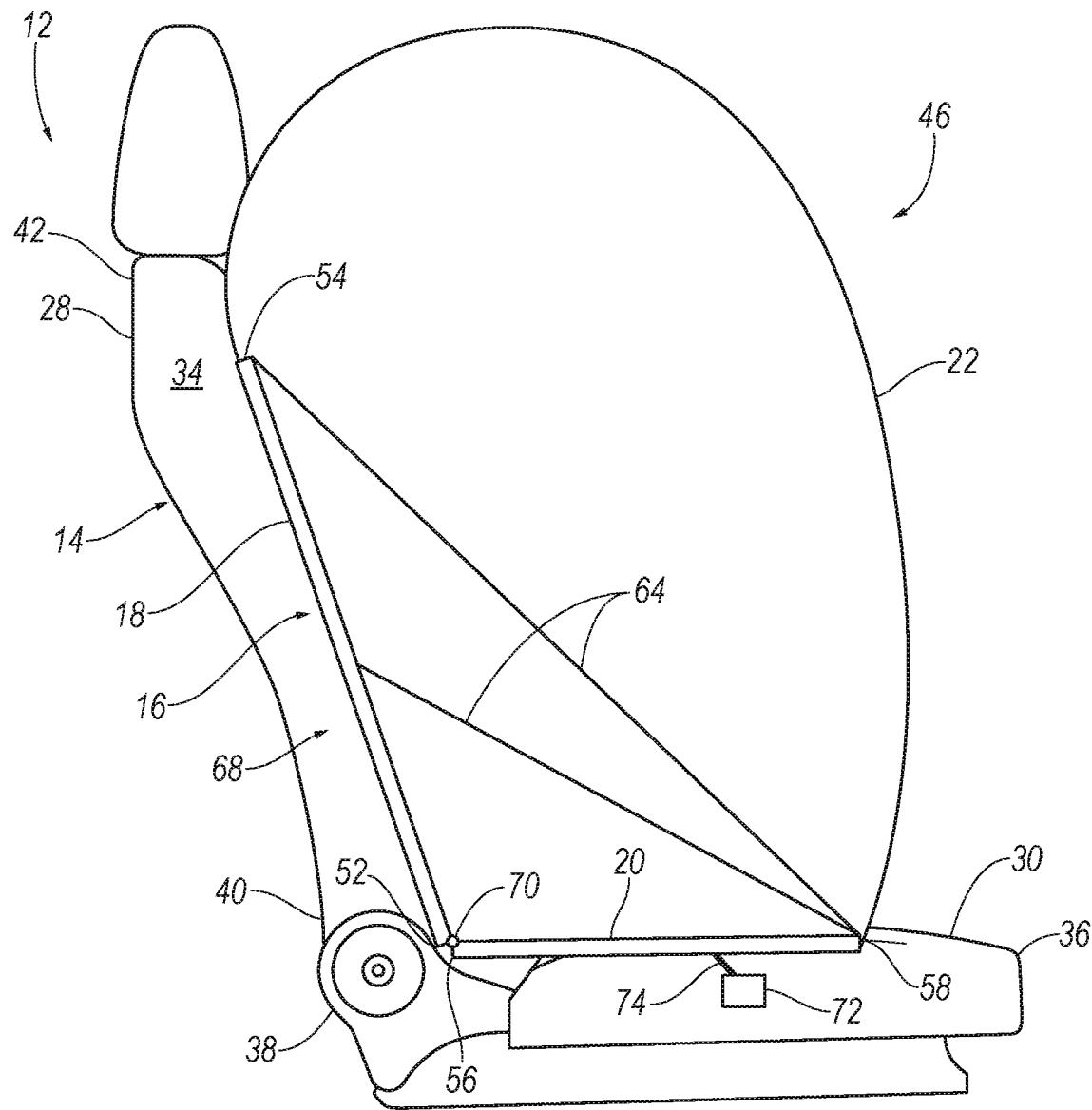
FIG. 3C is a side view of the seat including the airbag in the inflated position.

The vehicle 10 may lack components, e.g., a center console, alongside the seat 14, e.g., to allow occupants to move within the vehicle 10. In other words, the vehicle 10 may lack a reaction surface alongside the seat 14 for the airbag 22. During a vehicle impact, the airbag 22 may be inflated from an uninflated position, as shown in FIGS. 1-2, to an inflated position, as shown in FIGS. 3A-3C. During the vehicle impact, an occupant of the seat 14 may be forced into the airbag 22 in the inflated position. The airbag 22 may provide coverage so as to control the kinematics of the occupant, e.g., a torso of the occupant. By being fixed to the first arm 18 and the second arm 20, the airbag 22 may increase the likelihood that the airbag 22 provides coverage to control the kinematics of the occupant regardless of whether another component is adjacent to the seat 14 to provide a reaction surface for the airbag 22.

With reference to FIG. 1, the vehicle 10 may be any type of passenger or commercial automobile such as a car, a truck, a sport utility vehicle, a crossover, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

The vehicle 10 includes a body 24 defining a passenger cabin (not numbered) to house occupants, if any, of the vehicle 10. The body 24 may include a roof (not numbered) and a floor 26 with the roof defining an upper boundary of the passenger cabin and the floor 26 defining a lower boundary of the passenger cabin. The body 24 includes doors openable to allow ingress to and egress from the passenger cabin.

The passenger cabin may extend across the vehicle 10, i.e., from one side to the other side of the vehicle 10. The passenger cabin includes a front end (not numbered) and a rear end (not numbered) with the front end being in front of the rear end during forward movement of the vehicle 10. The passenger cabin includes one or more seats 14. The seats 14 may be arranged in any suitable arrangement. For example, one or more of the seats 14 may be at the front end of the passenger cabin, i.e., a front seat, and/or one or more of the seats 14 may be at the rear end of the passenger cabin, i.e., a rear seat.

With reference to the Figures, each seat 14 may include a seatback 28 and a seat bottom 30. The seatback 28 may be supported by the seat bottom 30 and may be stationary or movable relative to the seat bottom 30. The seatback 28 and the seat bottom 30 may be adjustable in multiple degrees of freedom. Specifically, the seatback 28 and the seat bottom 30 may themselves be adjustable, in other words, adjustable components within the seatback 28 and/or the seat bottom 30 may be adjustable relative to each other.

Each seat 14 defines a lateral axis A and a vertical axis V transverse to the lateral axis A. Each seat includes two sides 32, 34 spaced from each other along the lateral axis A. The sides 32, 34 extend along the seatback 28 and the seat bottom 30. The sides 32, 34 may support an occupant laterally relative to the seat 14. As one example, one of the sides 32, 34 may be an outboard side 32, and the other of the sides 32, 34 may be an inboard side 34 (with "inboard" and "outboard" referring to the relative position of the sides in a cross-vehicle direction). In such an example, the outboard side 32 is between the inboard side 34 of the seat 14 and the adjacent door.

As shown in the Figures, the seat bottom 30 includes a front end 36 and a back end 38. The seatback 28 is at the back end 38. The front end 36 is spaced from the back end 38 and the seatback 28. The seatback 28 extends across the seat bottom 30, e.g., from one side 32 of the seat 14 to the other side 34 of the seat 14, at the back end 38.

The seatback 28 includes a bottom 40 at the seat bottom 30 and a top 42 spaced from the bottom 40 and the seat bottom 30 along the vertical axis V of the seat 14. For example, the top 42 may support a head restraint (not numbered), i.e., be disposed between the head restraint and the seat bottom 30. The seatback 28 includes a front 44 that faces an occupant seating area 46 of the seat 14. The occupant seating area 46 is the area occupied by an occupant when seated on the seat bottom 30.

With continued reference to FIG. 1, each seat 14 defines a seat-forward direction D1. The seat-forward direction D1 extends forward relative to the seat 14. For example, the seat-forward direction D1 may extend from a rear of the seat 14 to a front of the seat 14 relative to an occupant of the seat 14, i.e., the occupant of the seat 14 faces in the seat-forward direction D1. As another example, the seat bottom 30 may extend from the seatback 28 in the seat-forward direction D1.

Each seat 14 is supported by the floor 26, as shown in FIG. 1. Each seat 14 may slide relative to the floor 26, e.g., in the seat-forward direction D1 or a seat-backward direction. In such an example, the seat 14 may be supported on a seat track (not shown) to allow the seat 14 to move in the seat-forward direction D1 or the seat-backward direction. The seat 14 may be selectively slidable relative to the seat track. In other words, the occupant may slide the seat 14 along the seat track and may secure the seat 14 to the seat track at selected position. For example, the occupant may actuate a motor (not shown) that moves the seat 14 along the seat track. As another example, each seat 14 may be fixed relative to the floor 26. In this situation, the seat 14 may be immovable relative to the floor 26.

With reference to FIG. 2, the seat 14 includes a seat frame 48. The seat frame 48 may include panels and/or may include tubes, beams, etc. The seat frame 48 may be formed of any suitable plastic material, e.g., carbon fiber reinforced plastic (CFRP), glass fiber-reinforced semi-finished thermoplastic composite (organosheet), etc. Alternatively, for example, some or all components of the frame may be formed of a suitable metal, e.g., steel or aluminum.

The seat 14 includes a covering 60 supported on the seat frame 48. The covering 60 may be cloth, leather, faux leather, or any other suitable material. The seat 14 may include padding material between the covering 60 and the seat frame 48. The padding material may be foam or any other suitable material. The cover may be stitched in panels around the seat frame 48 and padding material.

With continued reference to FIG. 2, the seat 14, e.g., the covering 60, may include a tear seam 66. The tear seam 66 may be disposed on one side 32, 34 of the seat 14. For example, the tear seam 66 may be disposed on the inboard side 34 of the seat 14 and adjacent to the airbag 22. Said differently, the airbag 22 may extend through the tear seam 66 in the inflated position. The tear seam 66 may have any suitable shape. For example, the tear seam 66 may have a linear shape, i.e., extending in a line along the seat 14.

The tear seam 66 may be designed to tear apart when subjected to a tensile force above a threshold magnitude. In other words, the covering on one side of the tear seam 66 separates from the covering on the other side of the tear seam 66 when the force is above the threshold magnitude. The threshold magnitude may be chosen to be greater than forces from, e.g., inadvertent pushing against the seat 14 by an occupant but be less than forces from the deployment of the airbag 22. The tear seam 66 may be, for example, a line of perforations through the covering, a line of thinner covering material than the rest of the covering, etc.

With continued reference to FIG. 2, the restraint system 12 includes a side airbag assembly 68, which includes the airbag housing 16, the airbag 22, and an inflator 50. The seat 14 may support the side airbag assembly 68, and specifically, may support the airbag 22 when the airbag 22 is in the inflated position. The side airbag assembly 68 may be mounted to the seat 14, as discussed further below. More than one side airbag assembly 68 may be supported on the seat 14. For example, one side airbag assembly 68 may be supported on the inboard side 34 of the seat 14, as shown in the Figures. As another example, one side airbag assembly 68 may be supported on each side 32, 34 of the seat 14.

The airbag housing 16 houses the airbag 22 in the uninflated position. In other words, the airbag 22 is enclosed between the first arm 18 and the second arm 20 in the uninflated position, as shown in FIG. 2. The airbag 22 may be folded and/or rolled in the airbag housing 16 when the airbag 22 is in the uninflated position. As described below, the airbag 22 expands from and is supported by the airbag housing 16 as the airbag 22 inflates from the uninflated position to the inflated position. The housing may be of any suitable type and construction, e.g., a polymer, a composite, a combination of rigid materials, etc.

The airbag housing 16 may include a joint 70 between the first arm 18 and the second arm 20, as shown in the Figures. The first arm 18 meets the second arm 20 at the joint 70. The joint 70 is a rotatable joint. In other words, the first and second arms 18, 20 are rotatably connected to each other at the joint 70. In such an example, the joint 70 may define the rotational axis R. The rotational axis R is generally parallel to the lateral axis A of the seat 14. In this context, "generally" means that the rotation axis R supports rotation of the first arm 18 along a side of the occupant, e.g., inboard of the occupant seating area 46, even if the rotational axis R deviates from parallel.

The joint 70 may, for example, be a hinge between the first arm 18 and the second arm 20. The hinge may be a locking hinge. In such examples, the locking hinge releasably retains the second arm 20 in the deployed position. The locking hinge includes a lock that releasably engages the second arm 20 and the first arm 18 to prevent relative rotation. The lock may be, for example, a spring, a retractable pin, an electromagnet, etc.

The first arm 18 is mounted to the seatback 28, e.g., the seat frame 48, as shown in FIG. 2. For example, the first arm 18 may include locating elements, fasteners, etc., that engage the seatback 28. Additionally, or alternatively, fasteners may engage the first arm 18 and the seatback 28 to mount the first arm 18 to the seatback 28.

With continued reference to FIG. 2, the first arm 18 includes a proximal end 52 and a distal end 54 spaced from each the proximal end 52. The joint 70 is disposed at the proximal end 52 of the first arm 18. That is, the distal end 54 of the first arm 18 is spaced from the rotational axis R. The first arm 18 is elongated from the proximal end 52 to the distal end 54, e.g., along the seatback 28. In other words, the longest dimension of the first arm 18 is from the proximal end 52 to the distal end 54.

The second arm 20 includes a proximal end 56 and a distal end 58 spaced from the proximal end 56. The joint 70 may be disposed at the proximal end 56 of the second arm 20. In other words, the proximal ends 52, 56 of the first and second arms 18, 20 may be rotatably connected to each other via the joint 70. The distal end 58 of the second arm 20 is spaced from the rotational axis R. The distal end 58 of the second arm 20 is rotatable about the rotational axis R.

With continued reference to FIG. 2, the second arm 20 is elongated from the proximal end 56 to the distal end 58. In other words, the longest dimension of the second arm 20 is from the proximal end 56 to the distal end 58. The second arm 20 may be elongated a different amount than the first arm 18. For example, the ends 56, 58 of the second arm 20 may be spaced from each other by an amount less than the ends 52, 54 of the first arm 18. In other words, the second arm 20 may be shorter than the first arm 18.

The second arm 20 is rotatable relative to the first arm 18, i.e., the seat 14, from an undeployed position, as shown in FIGS. 1 and 2, to a deployed position, as shown in FIGS. 3A-3C, when the airbag 22 inflates. In the undeployed position, the airbag housing 16, i.e., the first arm 18 and the second arm 20, may be disposed in the seatback 28, e.g., between the covering 60 and the seat frame 48. In other words, the covering 60 may cover the airbag housing 16 when the second arm 20 is in the undeployed position. In the undeployed position, the second arm 20 is elongated along the first arm 18. The distal ends 54, 58 of the first and second arms 18, 20 may be spaced from each other when the second arm 20 is in the undeployed position, as shown in FIG. 2. In the undeployed position, the first arm 18 and the second arm 20 define a cavity (not shown) therebetween that houses the airbag 22. As the airbag 22 inflates toward the inflated position, the second arm 20 rotates about the rotational axis R thus breaking through the tear seam 66 and moving the second arm 20 to the deployed position. That is, inflation of the airbag 22 forces the second arm 20 to rotate to the deployed position.

In the deployed position, the second arm 20 and the airbag 22 may extend through the seatback 28, e.g., the tear seam 66 adjacent to the airbag housing 16. In the deployed position, the second arm 20 is elongated transverse to the first arm 18. Specifically, the first arm 18 is elongated along the seatback 28 and the second arm 20 is elongated along the seat bottom 30, i.e., in the seat-forward direction D1, as shown in FIGS. 3A-3C. In this situation, the second arm 20 may extend outwardly from the seatback 28, e.g., in the seat-forward direction D1. In such an example, the second arm 20 may be disposed adjacent to the seat bottom 30.

With reference to FIGS. 3A-3C, the second arm 20 and the seat 14 may lock with each other in a fixed position when the second arm 20 is in the deployed position. For example, the seat 14 may include a bracket 72, and the second arm 20 may include a bar 74 rotatable relative to the second arm 20. The bracket 72 may be fixed to the seat bottom 30, e.g., between the front end 36 and the back end 38 of the seat bottom 30. The bracket 72 may extend inboard of the seat bottom 30, e.g., along the lateral axis A of the seat 14. The bracket 72 may include a first side (not numbered) extending along the seat bottom 30, a second side (not numbered) spaced from the seat bottom 30, and a third side (not numbered) extending from the first side to the second side along the lateral axis A of the seat 14. In other words, the bracket 72 may have a U-shape in cross-section along the lateral axis A of the seat 14.

The bar 74 may be rotatably connected to the second arm 20, e.g., via a rotatable joint, such as a hinge. The bar 74 may be connected to the second arm 20 between the proximal end 56 and the distal end 58 of the second arm 20. The bar 74 may extend along the second arm 20 when the second arm 20 is in the undeployed position, as shown in FIG. 2. As the second arm 20 rotates to the deployed position, the bar 74 may rotate about a second rotational axis (not numbered), e.g., defined by the rotational joint, that is generally parallel to the rotational axis R. The bar 74 may extend transverse to the second arm 20 when the second arm 20 is in the deployed position, as shown in FIGS. 3A-3C. For example, the bar 74 may extend from the second arm 20 to the bracket 72 when the second arm 20 is in the deployed position.

The bracket 72 and the bar 74 are selectively engageable with each other from an unlocked position to a locked position. In the unlocked position, the bracket 72 and the bar 74 are spaced from each other, i.e., not engaged with each other. In this situation, the second arm 20 is rotatable relative to the seat 14, e.g., during deployment. In the locked position, the bracket 72 and the bar 74 are engaged with each other, i.e., fixed relative to each other. For example, the bar 74 may be partially disposed in the bracket 72, e.g., between the first and second sides of the bracket 72 and abutting the third side of the bracket 72, when the second arm 20 is in the deployed position. In other words, the bracket 72 and the bar 74 prevent the second arm 20 from moving relative to the seat 14. Said differently, the bracket 72 and the bar 74 lock the second arm 20 and the seat 14 with each other in the fixed position when the second arm 20 is in the deployed position.

The side airbag assembly 68 may include a base 62 attached to the airbag housing 16 and supporting the airbag 22. For example, the base 62 may be attached to the first arm 18, as shown in FIG. 2. The base 62 may be disposed between the first arm 18 and the second arm 20. That is, the base 62 may be covered by the airbag housing 16 when the second arm 20 is in the undeployed position. The base 62 may be flat. As another example, the base 62 may include a cavity (not shown) that may house the airbag 22 in the uninflated position and may support the airbag 22 in the inflated position. The base 62 may, for example, include clips, panels, etc. for attaching the airbag 22 and for attaching the base 62 to the airbag housing 16. The base 62 may be attached to any suitable component, e.g., the first arm 18, the second arm 20, etc.

The airbag 22 may be formed of any suitable airbag 22 material, e.g., from a woven polymer. For example, the airbag 22 may be formed of woven nylon yarn, e.g., nylon 6. Other suitable examples include polyether ether ketone (PEEK), polyetherketoneketone (PEKK), polyester, or any other suitable polymer. The woven polymer may include a coating such as silicone, neoprene, urethane, polyorganosiloxane, etc.

The airbag 22 may be a single continuous unit, e.g., a single piece of fabric. Alternatively, the airbag 22 may include a plurality of segments, i.e., two or more. The segments may be attached to each other in any suitable fashion, e.g., a plurality of panels attached by stitching, ultrasonic welding, etc.

As set forth above, the airbag 22 is inflatable from the uninflated position to the inflated position. In the uninflated position, the airbag 22 may be disposed in the airbag housing 16, e.g., between the first arm 18 and the second arm 20, as shown in FIG. 2. In other words, the airbag housing 16 may cover the airbag 22 in the uninflated position. During inflation, the airbag 22 may force the second arm 20 to rotate relative to the seat 14 to the deployed position. In the inflated position, the airbag 22 extends along the occupant seating area 46, e.g., in the seat-forward direction D1 and along the vertical axis V of the seat 14, between the occupant seating area 46 and another seat 14, i.e., inboard of the occupant seating area 46, as shown in FIGS. 3A-3C. In the inflated position, the airbag 22 may extend next to the occupant seating area 46 to control occupant kinematics.

With reference to FIGS. 3A-3C, the airbag 22 extends from the first arm 18 to the second arm 20. For example, the airbag 22 may extend along the first arm 18 from the second arm 20 towards the distal end 54 of the first arm 18, and the airbag 22 may extend along the second arm 20 from the first arm 18 towards the distal end 58 of the second arm 20. As one example, the airbag 22 may extend to the distal end 54 of the first arm 18 and/or to the distal end 58 of the second arm 20. As another example, the airbag 22 may be spaced from the distal end 54 of the first arm 18 and/or from the distal end 58 of the second arm 20. The airbag 22 may be disposed adjacent to the seatback 28 and the seat bottom 30 in the inflated position.

As set forth above, the airbag 22 is fixed to the first arm 18 and the second arm 20. The airbag 22 may, for example, be fixed along the first arm 18, e.g., from the second arm 20 towards the distal end 54 of the first arm 18. As another example, the airbag 22 may be fixed to the first arm 18 at specific locations along the first arm 18. As one example, the airbag 22 may be fixed to the distal end 54 of the first arm 18. Additionally, the airbag 22 may, for example, be fixed along the second arm 20, e.g., from the first arm 18 towards the distal end 58 of the second arm 20. As another example, the airbag 22 may be fixed to the second arm 20 at specific locations along the second arm 20. As one example, the airbag 22 may be fixed to the distal end 58 of the second arm 20. The airbag 22 may, for example, be fixed to the first arm 18 and the second arm 20 via stitching, ultrasonic welding, etc.

With continued reference to FIGS. 3A-3C, the side airbag assembly 68 may include a plurality of external tethers 64 extending from the first arm 18 to the second arm 20. At least some of the external tethers 64 may be disposed inboard of the airbag 22 relative to the seat 14, i.e., at least some of the external tethers 64 are disposed between the airbag 22 and the seat 14, as shown in FIG. 3B. Additionally, or alternatively, at least some of the external tethers 64 may be disposed outboard of airbag 22 relative to the seat 14, i.e., the airbag 22 is disposed between at least some of the external tethers 64 and the seat 14, as shown in FIGS. 3A and 3C. The side airbag assembly 68 may include any suitable number of external tethers 64.

The external tethers 64 may be attached to the first arm 18 and the second arm 20. The external tethers 64 may be attached at any suitable location along the first arm 18. For example, one external tether 64 may be attached to the distal end 54 of the first arm 18 and another external tether 64 may be attached to the first arm 18 at a location between the joint 70 and the distal end 54 of the first arm 18, as shown in the Figures. Similarly, the external tethers 64 may be attached at any suitable location along the second arm 20. For example, the external tethers 64 may be attached to the distal end 58 of the second arm 20. The external tethers 64 may be attached to the first arm 18 and the second arm 20, e.g., via stitching, ultrasonic welding, etc.

The external tethers 64 may, for example, be attached to the airbag 22. The external tethers 64 may be attached to the airbag 22 along an axis defined by the external tether 64 and extending from the first arm 18 to the second arm 20. The external tethers 64 may be attached to the airbag 22, e.g., via stitching, ultrasonic welding, etc. As another example, the external tethers 64 may be disconnected from the airbag 22. The external tethers 64 may be any suitable material. For example, the external tethers 64 may be a same material as the airbag 22.

The external tethers 64 may be uninflatable. In other words, the external tethers 64 may not define an inflation chamber, e.g., the external tethers 64 may be a panel of material that is not fixed to another panel, or itself, to enclose a volume for receiving inflation medium. The external tethers 64 may be a woven fabric, or any other suitable material.

The second arm 20 pulls the external tethers 64, e.g., about the rotational axis R, when the second arm 20 rotates to the deployed position. The external tethers 64 may be under tension when the second arm 20 is in the deployed position. In other words, the external tethers 64 may be taught, i.e., not relaxed, when the second arm 20 is in the deployed position. By tensioning the external tethers 64, the external tethers 64 may be a reaction surface for the airbag 22. That is, the external tethers 64 may provide a counteracting force against the airbag 22 when the airbag 22 is impacted by the occupant. In such an example, the external tethers 64 may provide lateral support for the airbag 22, which may assist the airbag 22 in controlling occupant kinematics.

The inflator 50 is in fluid communication with the airbag 22. The inflator 50 expands the airbag 22 with inflation medium, such as a gas, to move the airbag 22 from the uninflated position to the inflated position. The inflator 50 may be supported by any suitable component. For example, the inflator 50 may be fixed to the seatback 28, e.g., the seat frame 48, and spaced from the airbag housing 16, as shown in FIGS. 1 and 2. As another example, the inflator 50 may be attached to the first arm 18.

The inflator 50 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 50 may be, for example, at least partially in an inflation chamber of the airbag 22 to deliver inflation medium directly to the inflation chamber or may be connected to the inflation chamber through fill tubes, diffusers, etc.

Figure 4:
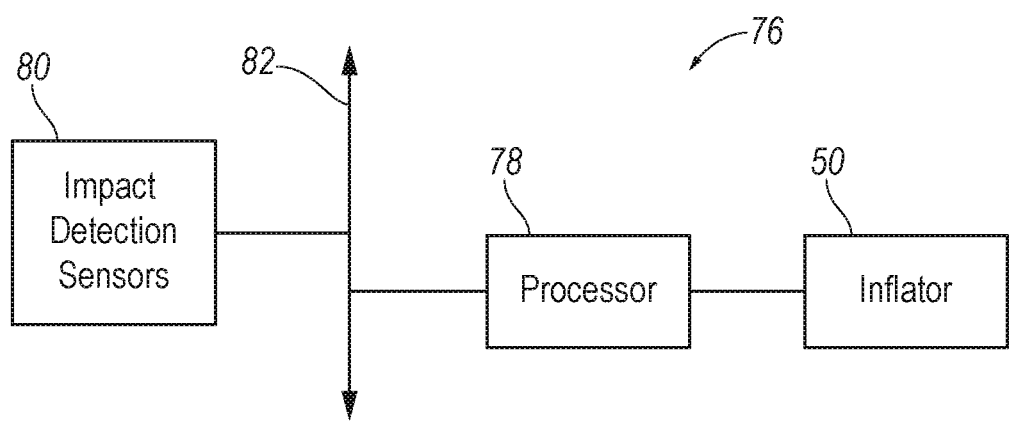
FIG. 4 is a block diagram of an inflation system of the vehicle.

With reference to FIG. 4, the vehicle 10 may include an inflation system 76 having a computer. The computer may be a microprocessor-based computing device implemented via circuits, chips, or other electronic components. For example, the computer may include a processor 78, memory, etc. The memory may store instructions executable by the processor 78 and the processor 78 may read the instructions from the memory and execute the instructions. The processor 78 may be programmed to initiate an inflation of the airbag 22 in response to the vehicle impact.

The vehicle 10 may include impact detection sensors 80 programmed to detect the vehicle impact to the vehicle 10. The impact detection sensors 80 may be disposed in the vehicle 10. The impact detection sensors 80 may be of various types, e.g., pressure sensor, acceleration sensor, vision sensor, etc. When the vehicle impact occurs, the processor 78 may receive one or more signals from the impact detection sensors 80 indicating the vehicle impact. In response to receiving the signals from the impact detection sensors 80, the processor 78 may initiate the inflation of the airbag 22. Alternatively, the processor 78 may initiate the inflation of the airbag 22 selectively based on information from the impact detection sensors 80 identifying the physical characteristics of the vehicle impact, e.g., which side of the vehicle 10 impacted, amount of pressure applied to the vehicle 10, etc. and also seat occupancy information, e.g., by using the occupancy sensors disposed inside the seats 14 sensing the occupancy status of the seats 14.

In order to receive the signals from the sensors, e.g., the impact detection sensors 80, and to initiate the inflation of the airbag 22, the processor 78 communicates with the sensors, e.g., the impact detection sensors 80, and the inflator 50, e.g., through a direct electrical wiring, through which an analog or a digital signal is transmitted, or through a communication network 82 like CAN (Control Area Network), Ethernet, LIN (Local Interconnect Network) or any other way.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper internal and fiber optics, including the internals that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In operation, the airbag 22 is in the uninflated position, under normal operating conditions of the vehicle 10. In the event of a vehicle impact, the impact detection sensors 84 detect the impact. The impact detection sensors 84 transmit a signal indicating the vehicle impact collision through the communication network 82 to the processor 78. When the vehicle impact is detected, the processor 78 transmits a signal through the communication network 82 triggering the inflator 50 to inflate the airbag 22 with inflation medium from the uninflated position to the inflated position. When the inflator 50 inflates the airbag 22 to the inflated position, the inflation medium flows into the inflation chamber of the airbag 22, increasing the pressure in the inflation chamber. As the pressure is increased in the inflation chamber, the airbag 22 inflates and forces the second arm 20 to rotate to the deployed position. As the occupant moves relative to the seat 14 due to momentum of the vehicle impact, the occupant moves towards the airbag 22 in the inflated position. When the occupant impacts the airbag 22, the airbag 22 controls the kinematics of the occupant. By being fixed to the first arm 18 and the second arm 20, the airbag 22 controls the kinematics of the occupant regardless of whether another component is adjacent to the seat 14 to provide a reaction surface for the airbag 22.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. Many modifications and variations of the present disclosure are possible in light of the above teachings, and the disclosure may be practiced otherwise than as specifically described.

What is claimed is:

1. A restraint system comprising:
 a seat defining a lateral axis;
 an airbag housing supported by the seat, the airbag housing including a first arm and a second arm;

the first arm being fixed relative to the seat and the second arm being rotatable relative to the seat about a rotational axis generally parallel to the lateral axis; and an airbag extending from the first arm to the second arm, the airbag being fixed to the first arm and the second arm.

2. The restraint system of claim 1, further comprising a plurality of external tethers extending from the first arm to the second arm when the airbag is in an inflated position.

3. The restraint system of claim 2, wherein the airbag is disposed between the seat and at least some of the plurality of external tethers in the inflated position.

4. The restraint system of claim 2, wherein the plurality of external tethers are attached to the first arm, the second arm, and the airbag, the external tethers are under tension between the first and second arms when the airbag is in the inflated position.

5. The restraint system of claim 2, wherein the plurality of external tethers are a reaction surface for the airbag in the inflated position.

6. The restraint system of claim 2, wherein the plurality of external tethers are fabric.

7. The restraint system of claim 2, wherein the plurality of external tethers are uninflatable.

8. The restraint system of claim 1, wherein the first arm and the second arm each include an end spaced from the rotational axis, the airbag is fixed to the end of the first arm and the end of the second arm.

9. The restraint system of claim 8, wherein the airbag is fixed along the first arm from the second arm to the end of the first arm and along the second arm from the first arm to the end of the second arm.

10. The restraint system of claim 1, wherein the second arm is rotatable from an undeployed position to a deployed position as a result of the airbag inflating.

11. The restraint system of claim 10, wherein the second arm extends along the first arm in the undeployed position, and the second arm extends transverse to the first arm in the deployed position.

12. The restraint system of claim 11, wherein the first and second arms each include an end, the end of the second arm being spaced from the end of the first arm in the undeployed position.

13. The restraint system of claim 10, wherein the second arm and the seat lock with each other in a fixed position when the second arm is in the deployed position.

14. The restraint system of claim 13, wherein the second arm includes a bar rotatable relative to the second arm when the second arm rotates relative to the seat to the deployed position.

15. The restraint system of claim 14, wherein the seat includes a bracket, the bar is engaged with the bracket when the second arm and the seat are locked with each other in the fixed position.

16. The restraint system of claim 1, further comprising an inflator in fluid communication with the airbag, the inflator is fixed to the seat and spaced from the housing.

17. The restraint system of claim 1, wherein the seat includes a seatback defining an occupant seating area and a seat bottom supporting the seatback, the airbag and the second arm being adjacent to the seat bottom when the airbag is in the inflated position and the airbag extends from the second arm along the occupant seating area in an inflated position.

18. The restraint system of claim 1, wherein the seat includes a seatback, the first arm is fixed to the seatback.

19. The restraint system of claim 1, further comprising a hinge between the first arm and the second arm.

20. The restraint system of claim 19, wherein the hinge is a locking hinge.

* * * * *